United States Patent
Ohzu et al.

(10) Patent No.: US 11,205,932 B2
(45) Date of Patent: Dec. 21, 2021

(54) ELECTRIC ROTARY MACHINE

(71) Applicant: HONDA MOTOR CO., LTD., Tokyo (JP)

(72) Inventors: Tatsuya Ohzu, Saitama (JP); Tadashi Yamaguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 16/657,087

(22) Filed: Oct. 18, 2019

(65) Prior Publication Data

US 2020/0127516 A1 Apr. 23, 2020

(30) Foreign Application Priority Data

Oct. 19, 2018 (JP) .............................. JP2018-197885

(51) Int. Cl.
*H02K 1/32* (2006.01)
*H02K 1/27* (2006.01)
*H02K 1/30* (2006.01)

(52) U.S. Cl.
CPC .............. *H02K 1/32* (2013.01); *H02K 1/276* (2013.01); *H02K 1/30* (2013.01)

(58) Field of Classification Search
CPC ........ H02K 1/32; H02K 1/276; H02K 1/2766; H02K 1/30; H02K 3/50
USPC .......................................................... 310/59
See application file for complete search history.

(56) References Cited

U.S. PATENT DOCUMENTS

| | | | |
|---|---|---|---|
| 2009/0261667 A1* | 10/2009 | Matsubara | H02K 1/2766 310/54 |
| 2012/0220379 A1 | 8/2012 | Murakami | |
| 2016/0322874 A1* | 11/2016 | Yoshinori | H02K 1/32 |
| 2017/0012503 A1* | 1/2017 | Okochi | H02K 1/32 |
| 2018/0062463 A1* | 3/2018 | Ito | H02K 1/24 |
| 2020/0099265 A1 | 3/2020 | Yoshizawa | |

FOREIGN PATENT DOCUMENTS

| | | | |
|---|---|---|---|
| JP | 2011114986 A | * | 6/2011 |
| JP | 2012-178939 A | | 9/2012 |
| JP | 2018-033265 A | | 3/2018 |
| WO | WO 2018/181244 A1 | | 10/2018 |

OTHER PUBLICATIONS

Aug. 4, 2020, Japanese Office Action issued for related JP application No. 2018-197885.

* cited by examiner

*Primary Examiner* — Alex W Mok

(74) *Attorney, Agent, or Firm* — Paratus Law Group, PLLC

(57) ABSTRACT

An electric rotary machine includes a rotor and a stator disposed radially outward of the rotor. The rotor includes a rotor shaft, a rotor core, a plurality of magnetic pole portions, a first end plate, and a second end plate. The first end plate includes a refrigerant discharge hole, a first groove portion communicating with a refrigerant flow path and communicating with a first refrigerant flow path hole, and a second groove portion communicating with the first groove portion and communicating with a refrigerant discharge hole of the first end plate. The second end plate includes a refrigerant discharge hole, and a third groove portion communicating with the first refrigerant flow path hole and communicating with a refrigerant discharge hole of the second end plate.

5 Claims, 9 Drawing Sheets

ELECTRIC ROTARY MACHINE

CROSS-REFERENCE TO RELATED APPLICATION(S)

This application claims priority from Japanese Patent Application No. 2018-197885 filed on Oct. 19, 2018, the entire contents of which are incorporated herein by reference.

FIELD

The present invention relates to an electric rotary machine.

BACKGROUND

With the recent increase in the size of electric rotary machines, the deterioration in the performance of electric rotary machines due to heat generation of magnetic pole portions cannot be neglected and methods for efficiently cooling the magnetic pole portions are being sought. JP-A-2018-33265 discloses a rotor of an electric rotary machine including a rotor core and a pair of end surface plates disposed on both end surfaces of the rotor core, where refrigerant supplied from a rotor shaft is introduced into the inside of the rotor core from an annular groove formed in one end surface plate and is discharged from the other end surface plate through a through hole formed inside the rotor core. This allows the rotor core to be cooled internally.

In the electric rotary machine, since a coil of a stator also generates heat, it is necessary to simultaneously cool the coil of the stator. However, regarding the rotor of the electric rotary machine described in JP-A-2018-33265, any method for cooling the coil of the stator is not described.

SUMMARY

The invention provides an electric rotary machine capable of cooling magnetic pole portions of a rotor from the inside of a rotor core and also cooling a coil of a stator using refrigerant discharged from the rotor core.

The invention provides an electric rotary machine which includes a rotor and a stator disposed radially outward of the rotor, wherein
the rotor includes:
a rotor shaft having a refrigerant flow path provided inside thereof;
a rotor core having a rotor shaft hole through which the rotor shaft passes, a plurality of magnet insertion holes provided along a circumferential direction, and a first refrigerant flow path hole axially passing through the rotor core;
a plurality of magnetic pole portions configured by magnets inserted into the magnet insertion holes;
a first end plate disposed at a first axial end side of the rotor core; and
a second end plate disposed on a second axial end side of the rotor core opposite to the first axial end side, and
the stator includes:
a first coil end located radially outward of the first end plate; and
a second coil end located radially outward of the second end plate,
the first end plate includes:
a refrigerant discharge hole;
a first groove portion communicating with the refrigerant flow path and communicating with the first refrigerant flow path hole; and
a second groove portion communicating with the first groove portion and communicating with the refrigerant discharge hole of the first end plate, and
the second end plate includes:
a refrigerant discharge hole; and
a third groove portion communicating with the first refrigerant flow path hole and communicating with the refrigerant discharge hole of the second end plate.

According to the invention, magnetic pole portions of a rotor can be internally cooled by refrigerant passing through a first refrigerant flow path hole, and a first coil end and a second coil end on both sides of the stator can be cooled by refrigerant discharged from refrigerant discharge holes of a first end plate and a second end plate.

DETAILED DESCRIPTION

Hereinafter, an electric rotary machine of each embodiment of the invention will be described based on the attached drawings.

Figure 1:
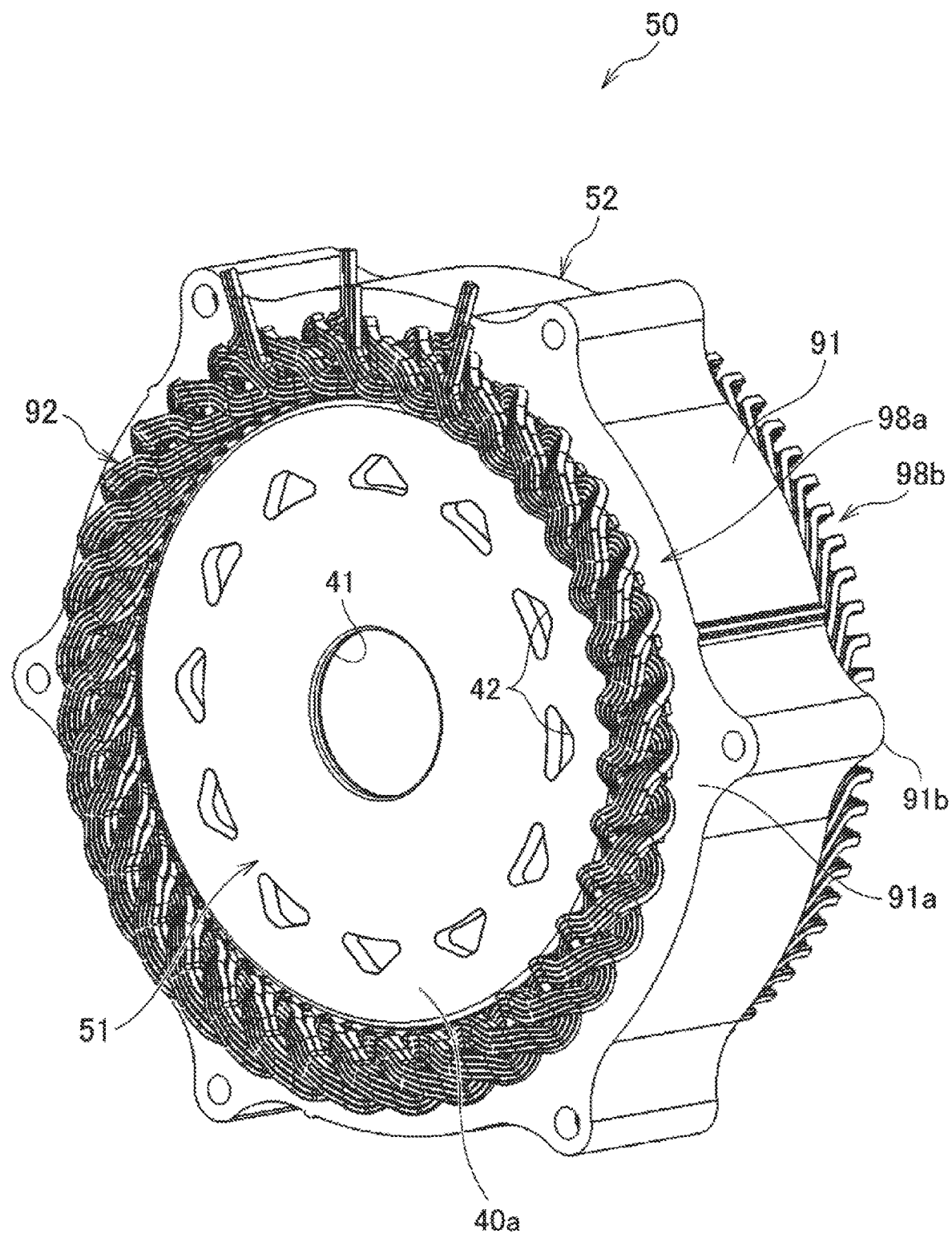
FIG. 1 is a perspective view of an electric rotary machine according to an embodiment of the invention.

As illustrated in FIG. 1, an electric rotary machine 50 is a so-called inner-rotor-type electric rotary machine including a rotor 51 and a stator 52 disposed to face an outer diameter side of the rotor 51 with a slight gap therebetween.

First Embodiment

[Rotor]

As illustrated in FIGS. 2 to 5, the rotor 51 of the first embodiment includes a rotor shaft 10, a rotor core 20 axially supported on the rotor shaft 10, and a plurality of magnetic pole portions 30, a first end plate 40a disposed on one axial end side of the rotor core 20, and a second end plate 40b disposed on the other axial end side of the rotor core 20.

In the rotor shaft 10, a refrigerant flow path 11 in which the refrigerant flows is formed. The refrigerant flow path 11 extends in an axial direction inside the rotor shaft 10 and the refrigerant can be supplied from the outside. As the refrigerant, Automatic Transmission Fluid (ATF) is used, for example. The refrigerant flow path 11 is connected to a circulation path formed in a housing (not illustrated) accommodating the electric rotary machine 50.

[Rotor Core]

The rotor core 20 is formed, for example, by laminating a plurality of electromagnetic steel plates formed by press processing in an axial direction and joining them with caulking, adhesion, or the like.

The rotor core 20 includes a rotor shaft hole 21 through which the rotor shaft 10 is inserted, a cooling portion 22 provided outside the rotor shaft hole 21 in the radial direction, and an electromagnetic portion 23 provided outside the cooling portion 22 in the radial direction.

The electromagnetic portion 23 is disposed on an outer periphery of the rotor core 20 and faces the stator 52. In the electromagnetic portion 23, a plurality of magnetic pole portions 30 are formed at equal intervals along a circumferential direction. Each magnetic pole portion 30 is constituted of three magnets 31 inserted into three magnet insertion holes 24 arranged in a substantial arc shape convex inward in a radial direction. The magnet 31 is, for example, a permanent magnet such as a neodymium magnet. The magnetic pole portion 30 may be constituted of two magnets arranged in two magnet insertion holes arranged in a substantially V-shape opening outward in the radial direction or constituted of one flat plate magnet or circular arc magnet.

The cooling portion 22 includes first refrigerant flow path holes 25 and second refrigerant flow path holes 26 alternately arranged along the circumferential direction.

The first refrigerant flow path hole 25 is located on a d-axis connecting the center of each magnetic pole portion 30 and the center CL of the rotor 51. The second refrigerant flow path holes 26 are located on q-axes passing through one circumferential end portion and the other circumferential end portion of each magnetic pole portion 30 and the center CL of the rotor 51.

The first refrigerant flow path hole 25 has a substantially pentagonal shape with a radially inward protruding apex portion and has a radial-inner-side apex portion 25$d$ which protrudes radially inward. The second refrigerant flow path hole 26 has a substantially rectangular shape which is convex on both sides in the circumferential direction and both sides in the radial direction and has a radial-inner-side apex portion 26$d$ which protrudes radially inward. The radial-inner-side apex portion 26$d$ of the second refrigerant flow path hole 26 is located further on an outer side than the radial-inner-side apex portion 25$d$ of the first refrigerant flow path hole 25 in the radial direction. That is, in the cooling portion 22 of the rotor core 20, the radial-inner-side apex portion 25$d$ of the first refrigerant flow path hole 25 is located at a radially innermost position.

[End Plate]

Figure 2:
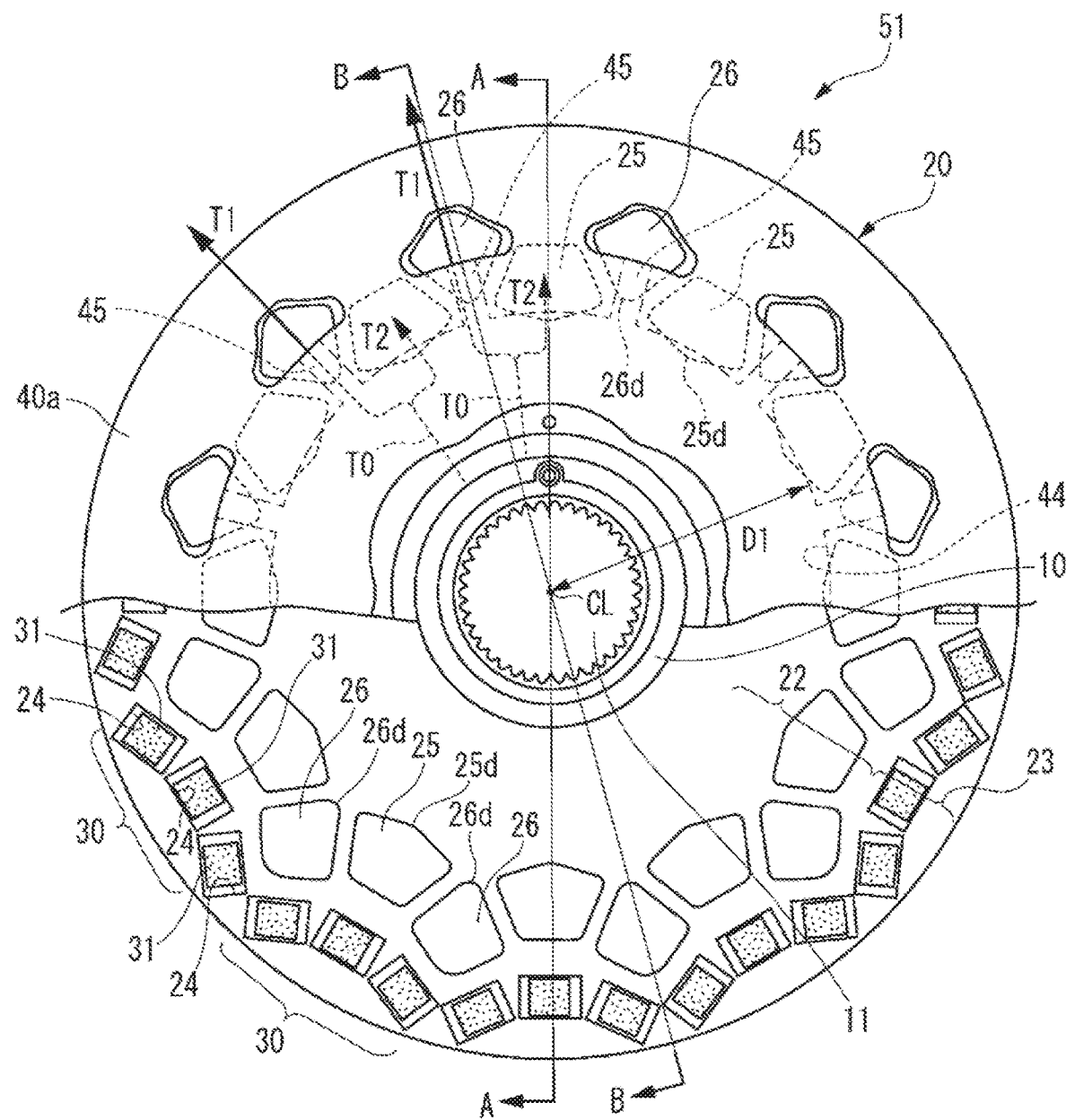
FIG. 2 is a front view of a rotor of the electric rotary machine according to a first embodiment, with a part of a first end plate cut away.
Figure 3:
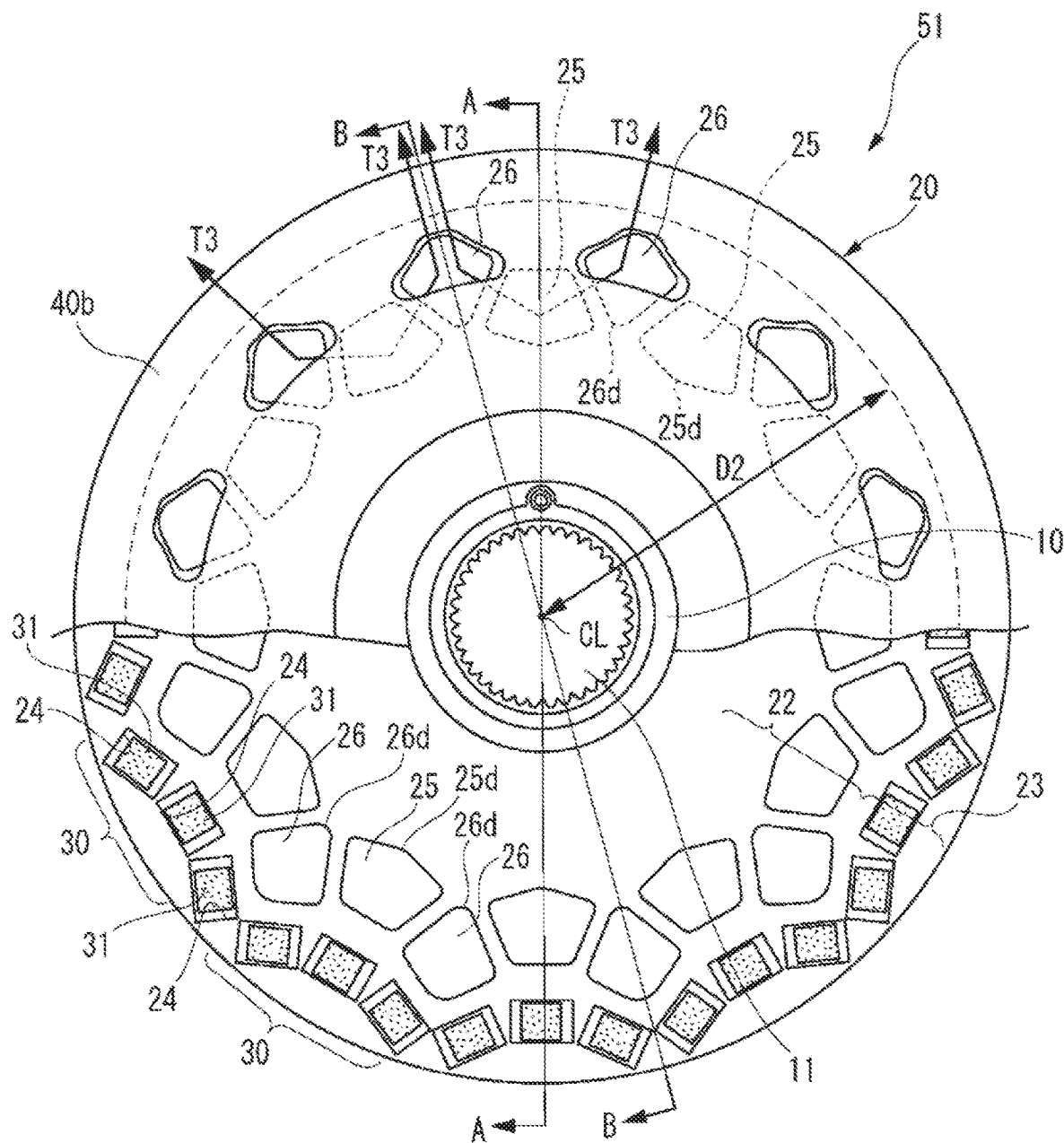
FIG. 3 is a rear view of the rotor of the electric rotary machine according to the first embodiment, with a part of a second end plate cut away.
Figure 4:
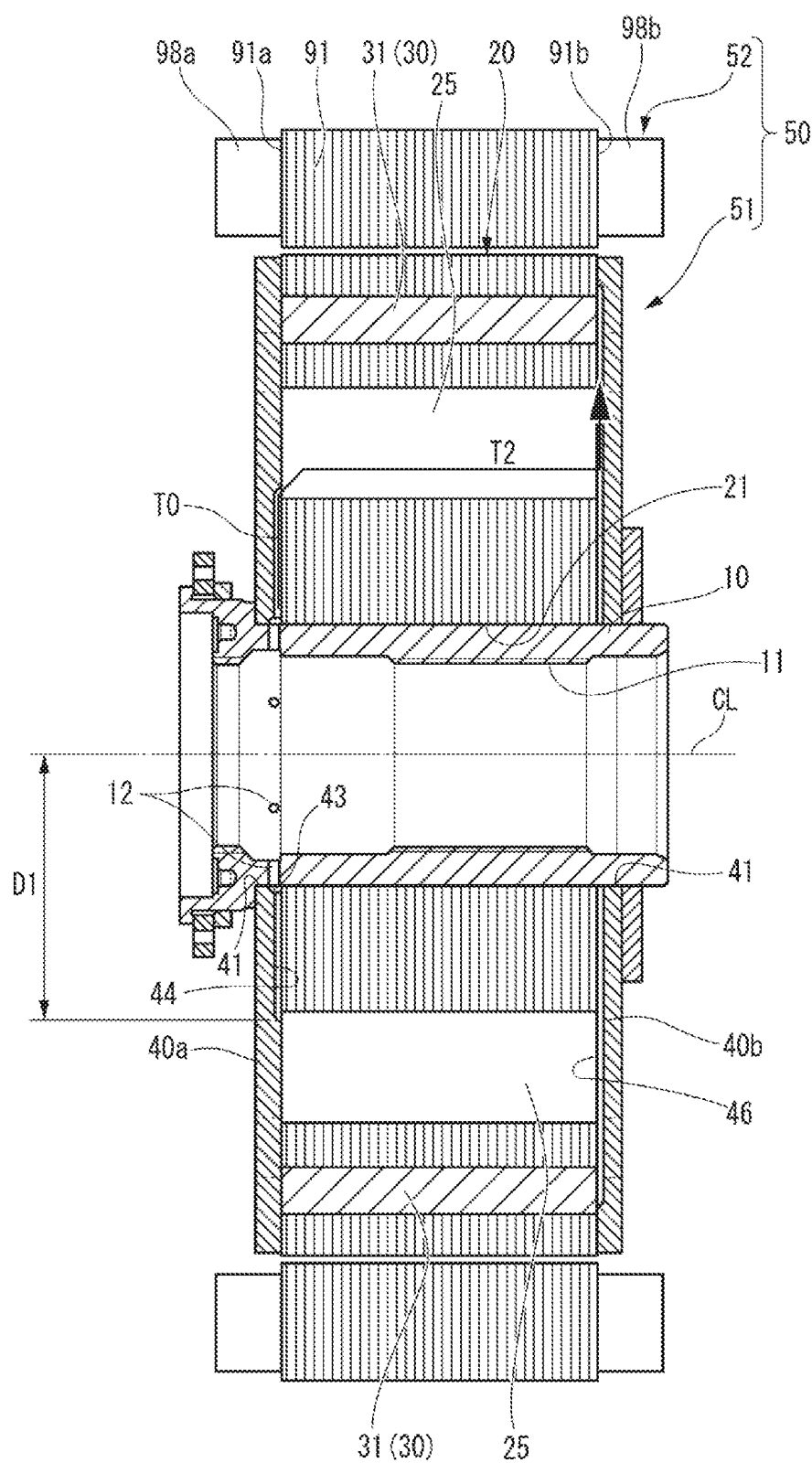
FIG. 4 is a cross-sectional view taken along the line A-A of FIGS. 2 and 3.
Figure 5:
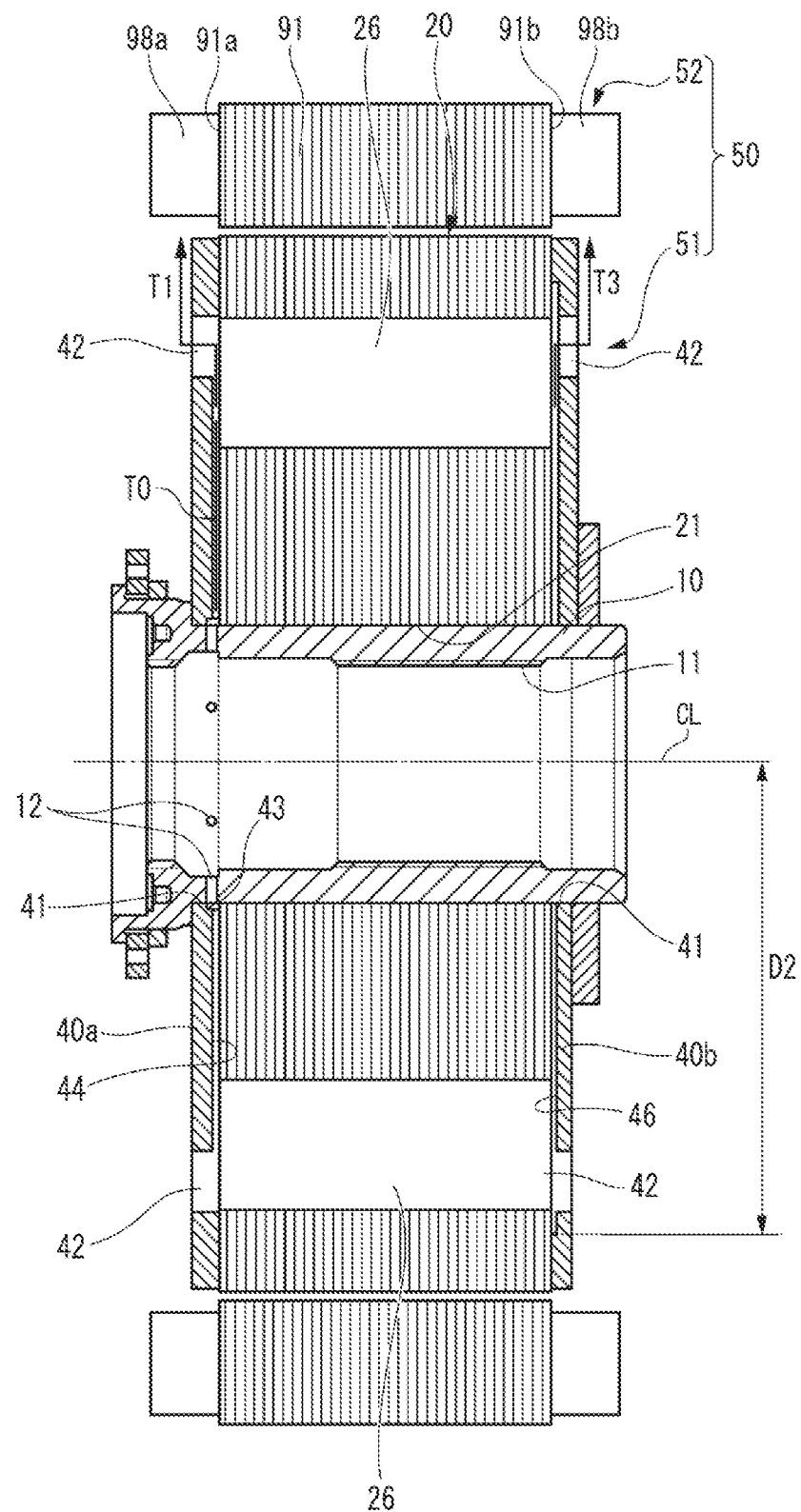
FIG. 5 is a cross-sectional view taken along the line B-B in FIGS. 2 and 3.

The first end plate 40$a$ is disposed to face an end surface of the rotor core 20, which is the end surface on one end side in an axial direction, as illustrated in FIGS. 2, 4, and 5. An insertion hole 41 for inserting the rotor shaft 10 is formed at the center of the first end plate 40$a$. In addition, on the radially outer side than the insertion hole 41, a plurality of refrigerant discharge holes 42 are formed at equal intervals in the circumferential direction so as to overlap with the second refrigerant flow path holes 26 formed in the rotor core 20.

Further, on an inner side surface of the first end plate 40$a$, formed are a refrigerant introduction groove 43 of an annular shape which communicates with a refrigerant supply path 12 formed in the rotor shaft 10 at a radial-inner-side corner portion of the insertion hole 41, a first groove portion 44 of an annular shape which communicates with the refrigerant introduction groove 43 and communicates with the first refrigerant flow path hole 25 of the rotor core 20, and a second groove portion 45 which communicates with the first groove portion 44 and communicates with a refrigerant discharge hole 42 of the first end plate 40$a$.

The first groove portion 44 is continuous from the refrigerant introduction groove 43 and is an annular concave groove having a radius D1 larger than the radial-inner-side apex portion 25$d$ of the first refrigerant flow path hole 25 from the center CL of the rotor 51 and smaller than the radial-inner-side apex portion 26$d$ of the second refrigerant flow path hole 26. Therefore, the refrigerant flowing through the refrigerant flow path 11 is introduced from the refrigerant introduction groove 43 to the first groove portion 44 as indicated by T0 in the drawing, and then the refrigerant is supplied from the first groove portion 44 to the first refrigerant flow path hole 25 of the rotor core 20 as indicated by T2 in the drawing. The refrigerant supplied to the first refrigerant flow path hole 25 cools the magnet 31 disposed in each magnetic pole portion 30 by flowing the first refrigerant flow path hole 25 from one side to the other side in the axial direction.

The second groove portion 45 is a concave groove extending linearly from the outer periphery portion of the first groove portion 44 in the radial direction. The second groove portions 45 are provided with the same number as that of the refrigerant discharge holes 42 of the first end plate 40$a$ and the second groove portions 45 are respectively connected to the refrigerant discharge holes 42. Therefore, a part of the refrigerant introduced from the refrigerant introduction groove 43 to the first groove portion 44 is discharged from the refrigerant discharge hole 42 of the first end plate 40$a$ through the second groove portion 45 as indicated by T1 in the drawing.

The second end plate 40$b$ is disposed to face an end surface of the rotor core 20, which is the end surface on the other end side in the axial direction. The insertion hole 41 through which the rotor shaft 10 is inserted is formed at the center of the second end plate 40$b$, and further, in a portion radially outer side than the insertion hole 41, a plurality of refrigerant discharge holes 42 are formed at equal intervals in the circumferential direction so as to overlap with the second refrigerant flow path holes 26 formed in the rotor core 20.

In addition, a third groove portion 46 is formed on the inner surface of the second end plate 40$b$ so as to communicate with the first refrigerant flow path hole 25 of the rotor core 20 and to communicate with the refrigerant discharge hole 42 of the second end plate 40$b$.

The third groove portion 46 is continuous from the insertion hole 41 and is an annular concave groove having a radius D2 larger than the refrigerant discharge hole 42 of the second end plate 40$b$ from the center CL of the rotor 51. Therefore, the refrigerant supplied from the first refrigerant flow path hole 25 is discharged from the refrigerant discharge hole 42 of the second end plate 40$b$ through the third groove portion 46 as indicated by T3 in the drawing.

Although the refrigerant discharge holes 42 of the first end plate 40$a$ and the second end plate 40$b$ have a substantially triangular shape with an apex radially outward, the shape of the refrigerant discharge hole 42 can be changed as appropriate.

[Stator]

The stator 52 includes a stator core 91, and coils 92 wound around a plurality of slots formed in the stator core 91. The coil 92 includes a first coil end 98$a$ which protrudes in the axial direction from one end surface 91a side of the stator core 91 and a second coil end 98b which protrudes in the axial direction from the other end surface 91b side of the stator core 91. The first coil end 98a is located radially outward of the first end plate 40a and the second coil end 98b is located radially outward of the second end plate 40b. Therefore, the refrigerant discharged from the refrigerant discharge hole 42 of the first coil end 98a is supplied to the first coil end 98a and the refrigerant discharged from the refrigerant discharge hole 42 of the second end plate 40b is supplied to the second coil end 98b.

[Cooling Action]

Next, the cooling action of the electric rotary machine 50 will be described.

In the electric rotary machine 50 of the embodiment, the refrigerant pressure-fed by a refrigerant pump (not illustrated) is supplied to the rotor shaft 10 via the circulation path. The refrigerant supplied to the refrigerant flow path 11 is supplied to a refrigerant supply path 12 radially passing through the rotor shaft 10.

The refrigerant of the refrigerant supply path 12 passes through the refrigerant introduction groove 43 and the first groove portion 44 of the first end plate 40a by the centrifugal force acting on the refrigerant as indicated by T0 in the drawing and is supplied to the first refrigerant flow path hole 25 of the rotor core 20 as indicated by T2 in the drawing, and then the refrigerant flows through the first refrigerant flow path hole 25 to internally cool the rotor core 20. Since the first refrigerant flow path hole 25 is disposed in the vicinity of the magnetic pole portion 30, the magnet 31 with the largest amount of heat generation can be cooled effectively.

The refrigerant supplied to the first groove portion 44 is further discharged from the refrigerant discharge hole 42 of the first end plate 40a through the second groove portion 45 from the first groove portion 44 as indicated by T1 in the drawing and supplied to the first coil end 98a. In addition, the refrigerant flowing through the first refrigerant flow path hole 25 is discharged from the refrigerant discharge hole 42 of the second end plate 40b through the third groove portion 46 as indicated by T3 in the drawing and supplied to the second coil end 98b. As a result, the refrigerant discharged from the rotor core 20 can be used to cool the coil 92 of the stator 52, particularly the first coil end 98a and the second coil end 98b on both sides of the stator core 91.

According to the embodiment, the refrigerant supplied from the refrigerant supply path 12 of the rotor shaft 10 can be distributed into two paths, that is, a path where the refrigerant is discharged from the refrigerant discharge hole 42 of the first end plate 40a through the first groove portion 44 and the second groove portion 45 of the first end plate 40a and a path where the refrigerant is discharged from the refrigerant discharge hole 42 of the second end plate 40b through the first groove portion 44 of the first end plate 40a, the first refrigerant flow path hole 25, and the third groove portion 46. Therefore, the first coil end 98a and the second coil end 98b on both sides of the stator 52 can be cooled. In addition, the magnetic pole portion 30 of the rotor 51 can be internally cooled by the refrigerant passing through the first refrigerant flow path hole 25.

Second Embodiment

Next, an electric rotary machine 50 according to a second embodiment will be described with reference to FIGS. 6 to 9. Since the electric rotary machine 50 of the second embodiment differs from the electric rotary machine 50 of the first embodiment only in the size of the refrigerant discharge hole 42 of the first end plate 40a, the same reference numerals are given to the same configurations and the descriptions thereof are omitted.

Figure 6:
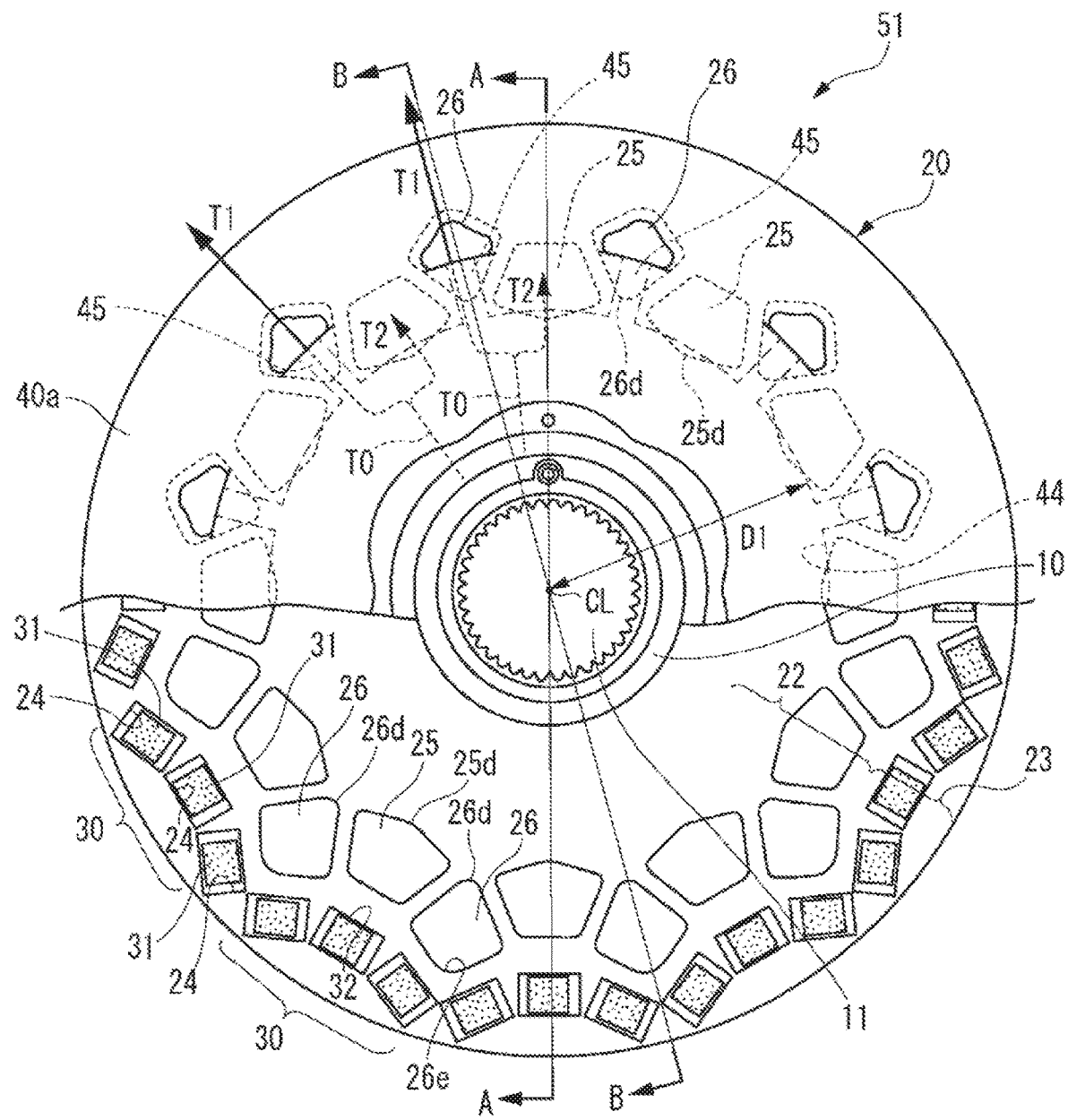
FIG. 6 is a front view of a rotor of an electric rotary machine according to a second embodiment, with a part of a first end plate cut away.
Figure 7:
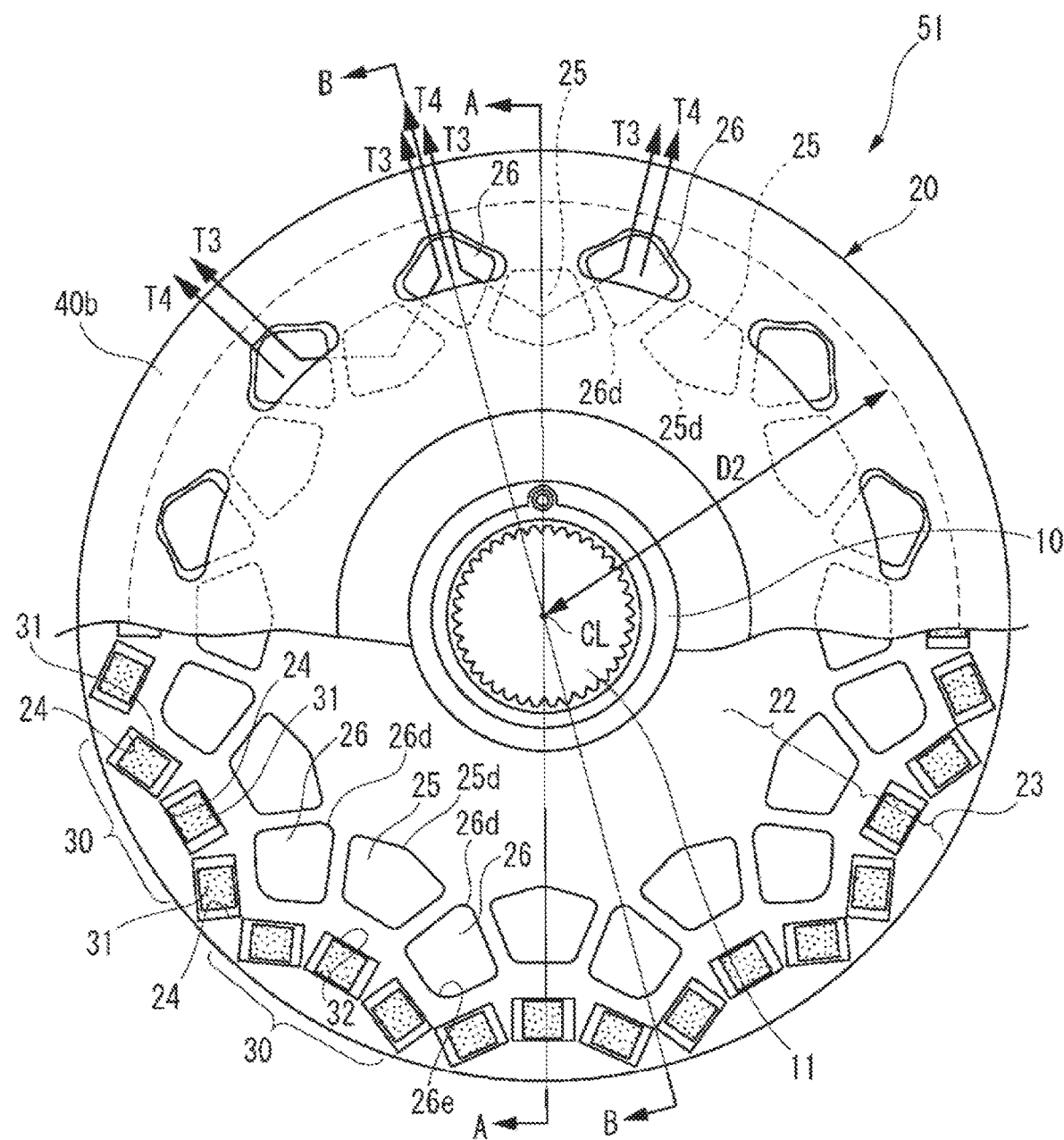
FIG. 7 is a rear view of the rotor of the electric rotary machine according to the second embodiment, with a part of a second end plate cut away.
Figure 8:
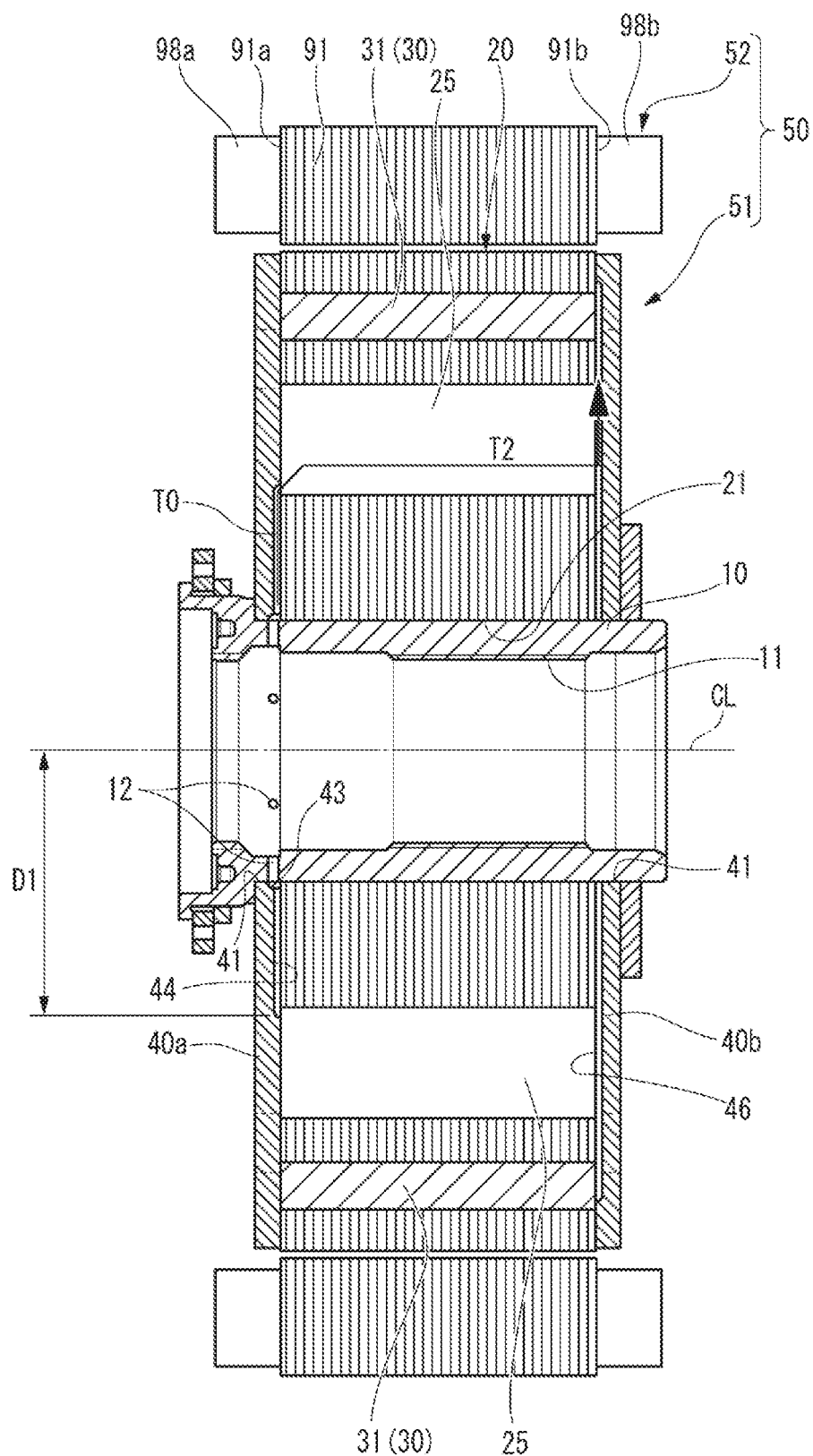
FIG. 8 is a cross-sectional view taken along the line C-C of FIGS. 6 and 7.
Figure 9:
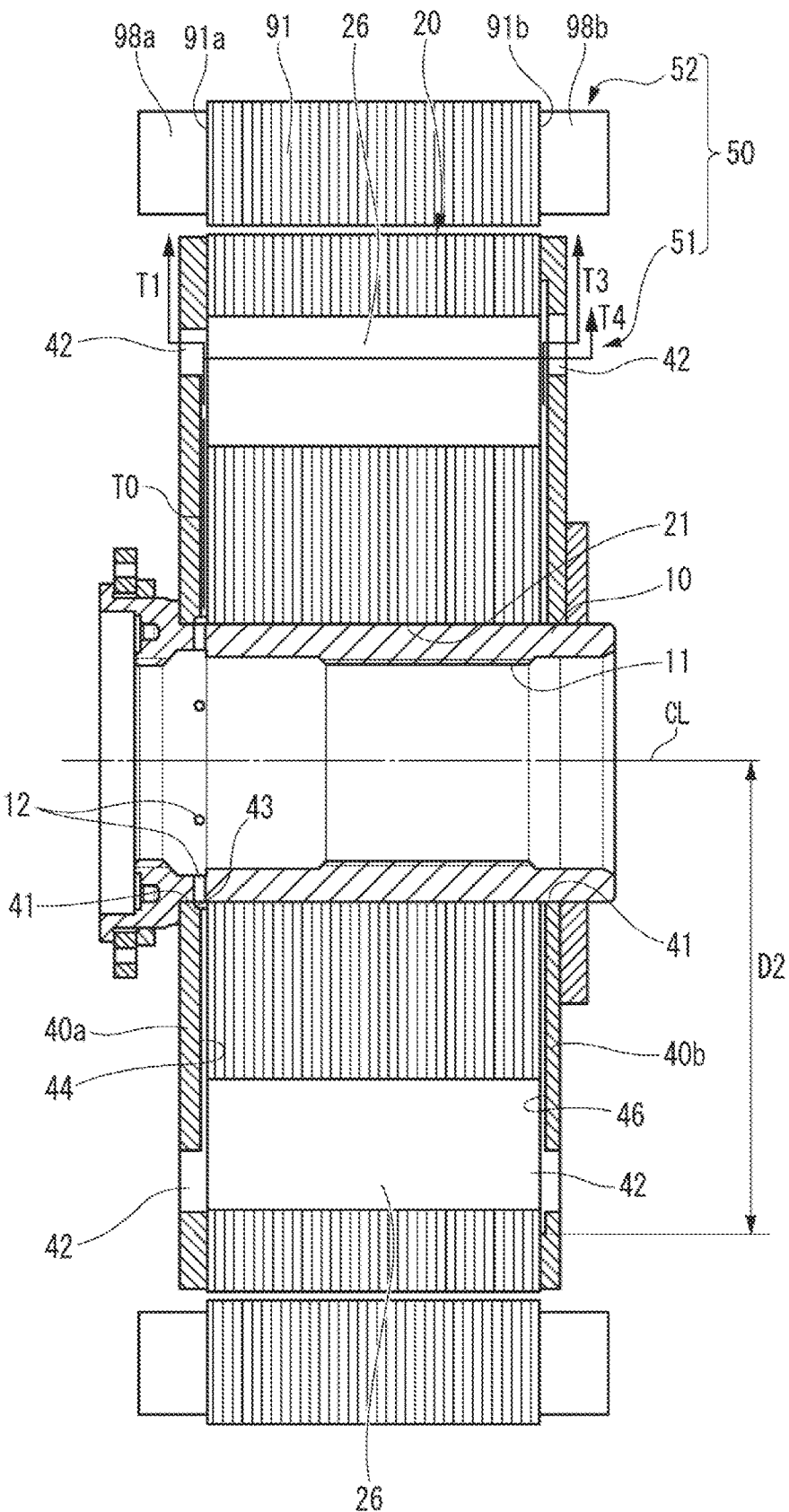
FIG. 9 is a cross-sectional view taken along the line D-D in FIGS. 6 and 7.

In the electric rotary machine 50 of the second embodiment, as illustrated in FIG. 6, the refrigerant discharge hole 42 of the first end plate 40a is smaller than the second refrigerant flow path hole 26 when viewed from the axial direction. Thus, by making the refrigerant discharge hole 42 smaller than the second refrigerant flow path hole 26, a part of the refrigerant passing through second groove portion 45 is introduced to the second refrigerant flow path hole 26 as indicated by T4 in the drawing. Further, as illustrated in FIGS. 7 and 9, since the third groove portion 46 of the second end plate 40b also communicates with the second refrigerant flow path hole 26, the refrigerant supplied from the second refrigerant flow path hole 26 is discharged from the refrigerant discharge hole 42 of the second end plate 40b through the third groove portion 46.

Therefore, according to the electric rotary machine 50 of the embodiment, in addition to the two paths described in the first embodiment, the refrigerant supplied from the refrigerant supply path 12 of the rotor shaft 10 flows through the first groove portion 44 and the second groove portion 45 of the first end plate 40a into the second refrigerant flow path hole 26 and is discharged from the refrigerant discharge hole 42 of the second end plate 40b through the third groove portion 46. Therefore, the refrigerant supplied from the refrigerant supply path 12 of the rotor shaft 10 can be distributed into three paths.

In particular, since an outer-diameter-side apex portion 26e of the second refrigerant flow path hole 26 is located radially outward of an innermost diameter portion 32 of the magnetic pole portion 30, a refrigerant flow path can be formed in the vicinity of the circumferential end portion of the magnetic pole portion 30 and the cooling performance of the rotor 51 is improved.

In the embodiment described above, modifications, improvements, and the like can be made as appropriate. For example, in the first embodiment, the second refrigerant flow path hole 26 may not be provided.

At least the following matters are described in the specification. In addition, although the components or the likes corresponding to those in the embodiments described above are shown in parenthesis, it is not limited thereto.

(1) An electric rotary machine (electric rotary machine 50) which includes a rotor (rotor 51) and a stator (stator 52) disposed radially outward of the rotor, wherein
　the rotor includes:
　　a rotor shaft (rotor shaft 10) having a refrigerant flow path (refrigerant flow path 11) provided inside thereof;
　　a rotor core (rotor core 20) having a rotor shaft hole (rotor shaft hole 21) through which the rotor shaft passes, a plurality of magnet insertion holes (magnet insertion holes 24) provided along a circumferential direction, and a first refrigerant flow path hole (first refrigerant flow path hole 25) axially passing through the rotor core;
　　a plurality of magnetic pole portions (magnetic pole portions 30) configured by magnets (magnets 31) inserted into the magnet insertion holes;
　　a first end plate (first end plate 40a) disposed at a first axial end side of the rotor core; and
　　a second end plate (second end plate 40b) disposed on a second axial end side of the rotor core opposite to the first axial end side,
　the stator includes:

a first coil end (first coil end 98a) located radially outward of the first end plate; and a second coil end (second coil end 98b) located radially outward of the second end plate, the first end plate includes:

a refrigerant discharge hole (refrigerant discharge hole 42);

a first groove portion (first groove portion 44) communicating with the refrigerant flow path and communicating with the first refrigerant flow path hole; and a second groove portion (second groove portion 45) communicating with the first groove portion and communicating with the refrigerant discharge hole of the first end plate, and the second end plate includes:

a refrigerant discharge hole (refrigerant discharge hole 42); and a third groove portion (third groove portion 46) communicating with the first refrigerant flow path hole and communicating with the refrigerant discharge hole of the second end plate.

According to (1), since the first end plate includes the first groove portion communicating with the refrigerant flow path of the rotor shaft and communicating with the first refrigerant flow path hole, the refrigerant supplied from the refrigerant flow path can be supplied to the first refrigerant flow path hole of the rotor core and the magnetic pole portions of the rotor can be internally cooled. Also, since the second groove portion of the first end plate communicates with the refrigerant discharge hole of the first end plate, a part of the refrigerant supplied to the first groove portion can be discharged from the refrigerant discharge hole of the first end plate through the second groove portion. This makes it possible to cool the first coil end on one end side of the stator.

Furthermore, the third groove portion of the second end plate communicates with the first refrigerant flow path hole and also communicates with the refrigerant discharge hole of the second end plate, the refrigerant supplied to the third groove portion through the first refrigerant flow path hole can be discharged from the refrigerant discharge hole. Therefore, it is possible to cool the second coil end on the other end side of the stator.

Therefore, the refrigerant supplied from the refrigerant flow path of the rotor shaft can be distributed into two paths and the first coil end and the second coil end on both sides of the stator can be cooled by the refrigerant discharged from the refrigerant discharge hole of the first end plate through the first groove portion and the second groove portion of the first end plate, and the refrigerant discharged from the refrigerant discharge hole of the second end plate through the first groove portion of the first end plate, the first refrigerant flow path hole, and the third groove portion. In addition, the magnetic pole portions of the rotor can be internally cooled by the refrigerant passing through the first refrigerant flow path hole.

(2) The electric rotary machine according to (1), wherein each of the first end plate and the second end plate is provided with a plurality of the refrigerant discharge holes.

According to (2), since the first end plate and the second end plate are respectively provided with a plurality of the refrigerant discharge holes, more refrigerant can be supplied to the first coil end and the second coil end.

(3) The electric rotary machine according to (1) or (2), wherein each of the first end plate and the second end plate is provided with a plurality of the refrigerant discharge holes at an equal interval in the circumferential direction.

According to (3), since the plurality of refrigerant discharge holes are provided at an equal interval in the circumferential direction in the first end plate and the second end plate, the refrigerant can be supplied to the first coil end and the second coil end without bias.

(4) The electric rotary machine according to (3), wherein a plurality of the second groove portions are provided to correspond to the plurality of refrigerant discharge holes.

According to (4), since the plurality of second groove portions are provided to correspond to the plurality of refrigerant discharge holes, more refrigerant can be supplied to the first coil end and the second coil end evenly along the circumferential direction.

(5) The electric rotary machine according to any one of (1) to (4), wherein the rotor core further includes a second refrigerant flow path hole (second refrigerant flow path hole 26) which penetrates the rotor core in an axial direction and which is disposed so as to overlap with the refrigerant discharge holes of the first end plate and the second end plate, the third groove portion communicates with the first refrigerant flow path hole, the second refrigerant flow path hole, and the refrigerant discharge hole of the second end plate, and the second refrigerant flow path hole is larger than the refrigerant discharge hole of the first end plate as viewed from the axial direction.

According to (5), a part of the refrigerant which flows through the first groove portion and the second groove portion of the first end plate to the refrigerant discharge hole of the first end plate is discharged from the refrigerant discharge hole of the first end plate through the first groove portion and the second groove portion of the first end plate and the remaining refrigerant flows into the second refrigerant flow path hole and is discharged from the refrigerant discharge hole of the second end plate through the third groove portion. Therefore, the refrigerant supplied from the refrigerant flow path of the rotor shaft can be distributed into three paths.

(6) The electric rotary machine according to (5), wherein an outer-diameter-side end portion (outer-diameter-side apex portion 26e) of the second refrigerant flow path hole is located further radially outward than an innermost diameter portion (innermost diameter portion 32) of the magnetic pole portions.

According to (6), it is possible to effectively cool the magnet, which is the heating element, by the refrigerant passing through the second refrigerant flow path hole.

(7) The electric rotary machine according to (5) or (6), wherein a plurality of the first refrigerant flow path holes are provided at a predetermined interval along the circumferential direction, a plurality of the second refrigerant flow path holes are provided at a predetermined interval along the circumferential direction, the first groove portion is an annular groove formed on an inner surface of the first end plate, and the second groove portion is a linear groove extending radially from the annular groove toward each of the second refrigerant flow path holes.

According to (7), a plurality of first refrigerant flow path holes and second refrigerant flow path holes are respectively provided at predetermined intervals along the circumferential direction, and the first groove portion is an annular groove, and further the second groove portion is a straight groove extending radially from the annular groove towards each second refrigerant flow path hole. As a result, the refrigerant can be supplied with good balance.

The invention claimed is:

1. An electric rotary machine which comprises a rotor and a stator disposed radially outward of the rotor, wherein
the rotor comprises:
a rotor shaft having a refrigerant flow path provided inside thereof;
a rotor core having a rotor shaft hole through which the rotor shaft passes, a plurality of magnet insertion holes provided along a circumferential direction, and a first refrigerant flow path hole axially passing through the rotor core;
a plurality of magnetic pole portions configured by magnets inserted into the magnet insertion holes;
a first end plate disposed at a first axial end side of the rotor core; and
a second end plate disposed on a second axial end side of the rotor core opposite to the first axial end side,
the stator comprises:
a first coil end located radially outward of the first end plate; and
a second coil end located radially outward of the second end plate,
the first end plate comprises:
a refrigerant discharge hole;
a first groove portion communicating with the refrigerant flow path and communicating with the first refrigerant flow path hole; and
a second groove portion communicating with the first groove portion and communicating with the refrigerant discharge hole of the first end plate,
the second end plate comprises:
a refrigerant discharge hole; and
a third groove portion communicating with the first refrigerant flow path hole and communicating with the refrigerant discharge hole of the second end plate, and
the rotor core further comprises a second refrigerant flow path hole which penetrates the rotor core in an axial direction and which is disposed so as to overlap with the refrigerant discharge holes of the first end plate and the second end plate,
the third groove portion communicates with the first refrigerant flow path hole, the second refrigerant flow path hole, and the refrigerant discharge hole of the second end plate,
the second refrigerant flow path hole is larger than the refrigerant discharge hole of the first end plate as viewed from the axial direction,
a plurality of the first refrigerant flow path holes are provided at a predetermined interval along the circumferential direction,
a plurality of the second refrigerant flow path holes are provided at a predetermined interval along the circumferential direction,
the first groove portion is an annular groove formed on an inner surface of the first end plate, and
the second groove portion is a linear groove extending radially from the annular groove toward each of the second refrigerant flow path holes.

2. The electric rotary machine according to claim 1, wherein
each of the first end plate and the second end plate is provided with a plurality of the refrigerant discharge holes.

3. The electric rotary machine according to claim 1, wherein
each of the first end plate and the second end plate is provided with a plurality of the refrigerant discharge holes at an equal interval in the circumferential direction.

4. The electric rotary machine according to claim 3, wherein
a plurality of the second groove portions are provided to correspond to the plurality of refrigerant discharge holes.

5. The electric rotary machine according to claim 1, wherein
an outer-diameter-side end portion of the second refrigerant flow path hole is located further radially outward than an innermost diameter portion of the magnetic pole portions.

* * * * *